UNITED STATES PATENT OFFICE.

WILLIAM H. LEWIS, OF PHILADELPHIA, PENNSYLVANIA, ASSIGNOR OF PART INTEREST TO H. E. THAYER, OF SAME PLACE.

IMPROVEMENT IN ARTIFICIAL STONE.

Specification forming part of Letters Patent No. 139,167, dated May 20, 1873; application filed March 28, 1873.

*To all whom it may concern:*

Be it known that I, WILLIAM HENRY LEWIS, of Philadelphia, in the county of Philadelphia and in the State of Pennsylvania, have invented certain new and useful Improvements in Making Artificial Stone; and do hereby declare that the following is a full, clear, and exact description thereof.

The nature of my invention consists in making artificial stone from the ingredients and by the process hereinafter described.

I use sulphur, two pounds; alum, one-quarter of a pound; Portland cement, one barrel; sand, two barrels; and water, four gallons. I first dissolve the alum and sulphur in the water at a temperature of 212° Fahrenheit, then thoroughly mix the cement and sand, and add the solution of alum and sulphur. After all these ingredients have been thoroughly incorporated I place the mixture in suitable molds for hardening.

Any suitable coloring-matter can be added or incorporated before the mixture is allowed to harden.

By this process I make a hard and durable stone.

Having thus fully described my invention, what I claim as new, and desire to secure by Letters Patent, is—

The within-described process for making artificial stone of the ingredients mentioned.

In testimony that I claim the foregoing I have hereunto set my hand this 3d day of March, 1873.

WILLIAM HENRY LEWIS.

Witnesses:
 FRANK K. HIPPLE,
 EUGENE WILEY.